US012280934B2

(12) United States Patent
Beydoun et al.

(10) Patent No.: US 12,280,934 B2
(45) Date of Patent: Apr. 22, 2025

(54) STORAGE VESSEL

(71) Applicant: LiquidPower Specialty Products Inc., Houston, TX (US)

(72) Inventors: Hammdy Danny Beydoun, Troy, MI (US); John Michel Gillespie, Houston, TX (US); Ara Alexander Casada, College Station, TX (US); Wim Verbeke, Harelbeke (BE)

(73) Assignee: LiquidPower Specialty Products Inc., Houston, TX (US)

( * ) Notice: Subject to any disclaimer, the term of this patent is extended or adjusted under 35 U.S.C. 154(b) by 98 days.

(21) Appl. No.: 16/285,503

(22) Filed: Feb. 26, 2019

(65) Prior Publication Data

US 2019/0263578 A1 Aug. 29, 2019

Related U.S. Application Data

(60) Provisional application No. 62/635,553, filed on Feb. 27, 2018.

(51) Int. Cl.

| | |
|---|---|
| ***B65D 81/18*** | (2006.01) |
| ***B01F 27/81*** | (2022.01) |
| ***B01F 27/85*** | (2022.01) |
| ***B01F 27/906*** | (2022.01) |
| ***B65D 90/20*** | (2006.01) |
| *B65D 85/84* | (2006.01) |

(52) U.S. Cl.

CPC .............. *B65D 81/18* (2013.01); *B01F 27/81* (2022.01); *B01F 27/85* (2022.01); *B01F 27/906* (2022.01); *B65D 90/20* (2013.01); *B65D 85/84* (2013.01); *B65D 2201/00* (2013.01)

(58) Field of Classification Search

CPC ........................ B01F 11/0054; B01F 15/0035; B01F 15/065; B01F 7/00975; B01F 7/1625; B01F 7/1665; B01F 7/18; B01F 7/20; B01F 27/2322; B01F 27/81; B01F 27/85; B01F 27/90; B01F 27/906; B01F 31/40; B01F 35/2212; B01F 35/92; B65D 2201/00; B65D 81/18; B65D 85/84; B65D 88/128; B65D 88/744; B65D 90/20

See application file for complete search history.

(56) References Cited

U.S. PATENT DOCUMENTS 4,476,788 A * 10/1984 Loevinger ............ B65D 88/744 165/169
4,898,474 A * 2/1990 Lipson .................... B01F 7/161 366/199

(Continued)

FOREIGN PATENT DOCUMENTS

BE 1009066 A3 * 11/1996 .......... B01F 13/0016

OTHER PUBLICATIONS

Google machine translation for “BE-1009066-A3” (Year: 1996).*

(Continued)

*Primary Examiner* — Marc C Howell
(74) *Attorney, Agent, or Firm* — Patterson + Sheridan, LLP

(57) ABSTRACT

A storage vessel assembly for storing chemical includes a storage vessel, a frame for housing the storage vessel, an agitation device disposed in the storage vessel, a temperature control system coupled to the storage vessel, and a controller configured to operate the agitation device and the temperature control system.

20 Claims, 4 Drawing Sheets

(56) References Cited

U.S. PATENT DOCUMENTS

| | | | | |
|---|---|---|---|---|
| 5,245,057 | A * | 9/1993 | Shirtum | B01J 19/1862 422/135 |
| 2003/0227819 | A1* | 12/2003 | Villwock | B01F 13/1044 366/151.1 |
| 2011/0281254 | A1* | 11/2011 | Chen | C12M 21/04 435/3 |
| 2014/0131360 | A1* | 5/2014 | Aoki | F17C 3/02 220/567.2 |
| 2014/0367953 | A1* | 12/2014 | Vaughn | B65D 90/046 220/601 |
| 2015/0299636 | A1* | 10/2015 | Virtanen | B01F 15/00662 435/303.3 |
| 2018/0028992 | A1* | 2/2018 | Stegemoeller | B01F 15/0283 |

OTHER PUBLICATIONS

Canadian Office Action in related application CA3035066 dated May 16, 2022.
Canadian Office Action in related application CA 3,035,066 dated Feb. 5, 2024.

* cited by examiner

STORAGE VESSEL

CROSS-REFERENCE TO RELATED APPLICATIONS

This application claims priority to U.S. Provisional Patent Application Ser. No. 62/635,553, filed on Feb. 27, 2018, which is incorporated herein by reference.

BACKGROUND

Field

This disclosure relates to storage vessels for storing liquid materials and, more particularly, storage of chemicals.

Description of the Related Art

Bulk packaging containers have found widespread use for storage and shipment of bulk goods. The bulk packaging containers assume many different forms. Among these forms are tank containers which are built to ISO standards ("International Organization for Standardization"). A tank container built to ISO standards is suitable for different modes of transportation. Both hazardous and non-hazardous products can be transported in ISO tank containers.

The tank container has a vessel of stainless steel in the middle of a steel frame. The frame is made according to ISO standards and is about 20 feet long, 8 feet wide, and 8 feet high. The contents of the tank range from about 7,000 to 10,000 gallons. A conventional ISO tank container has an outlet valve or port proximate a bottom of the vessel, a fill valve or port at a top of the vessel, and a vent valve or port at the top of the vessel.

The present disclosure is directed to improvements in storage vessels for storing liquid materials, such as chemicals.

SUMMARY

In one embodiment, a storage vessel assembly for storing chemical includes a storage vessel, a frame for housing the storage vessel, an agitation device disposed in the storage vessel, a temperature control system coupled to the storage vessel, and a controller configured to operate the agitation device and the temperature control system.

In another embodiment, a storage vessel assembly for storing chemical includes a storage vessel, a frame for housing the storage vessel, and a first agitation device disposed in the storage vessel, wherein the first agitation device includes a first impeller coupled to a first shaft, and wherein the first impeller is a first distance away from a bottom of the storage vessel. The storage vessel assembly further includes a second agitation device disposed in the storage vessel, wherein the second agitation device includes a second impeller coupled to a second shaft, and wherein the second impeller is a second distance away from a bottom of the storage vessel.

In another embodiment, a storage vessel assembly for storing chemical includes a storage vessel, a frame for housing the storage vessel, one or more motors disposed on the storage vessel, a heat exchanger coupled to the storage vessel, and a controller coupled to the storage vessel, wherein the one or more motors, the heat exchanger, and the controller are disposed within the frame.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the storage vessel are suitable for storing polymeric suspension and/or emulsion chemicals. In one embodiment, the storage vessel is disposed within and mounted to a steel frame. The combination of the storage vessel and the steel frame may be referred to as a storage vessel assembly. The storage vessel can be made of stainless steel and insulated. The temperature of the storage vessel can be controlled using a controller. The storage vessel can have a storage capacity greater than 1,500 gallons.

In one embodiment, the storage vessel includes at least one of a system for controlling the temperature inside the storage vessel, a device for agitating the chemical inside the storage vessel, a device for measuring the level of chemical contained within the storage vessel, and a controller for operating these components of the storage vessel. One or more of these components can be mounted to the storage vessel or the frame. The storage vessel is configured to connect, such as via hoses and piping, to at least one of a meter and a pump.

Figure 1:
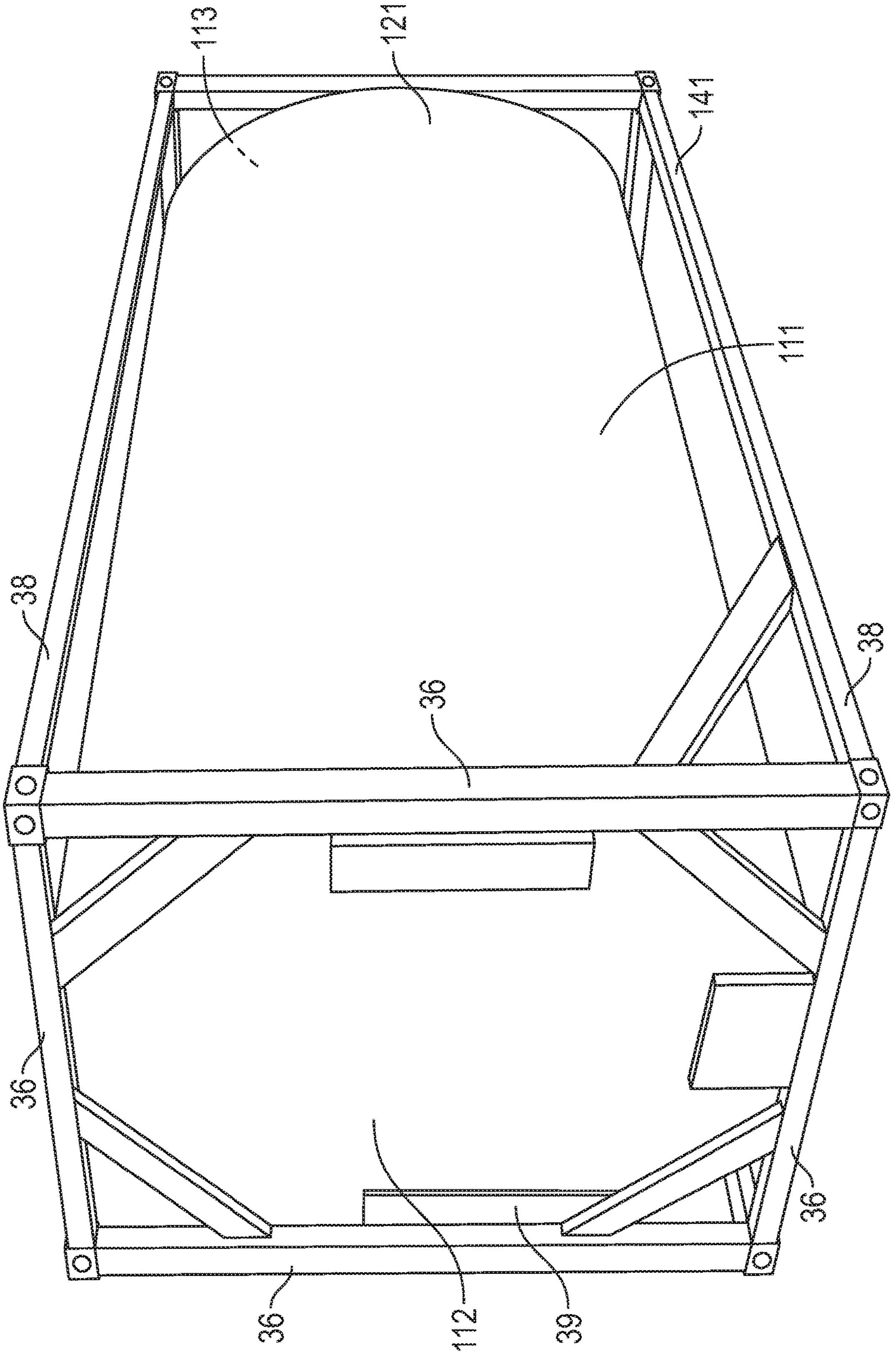
FIG. 1 illustrates an exemplary embodiment of a storage vessel mounted within a frame.
Figure 2B:
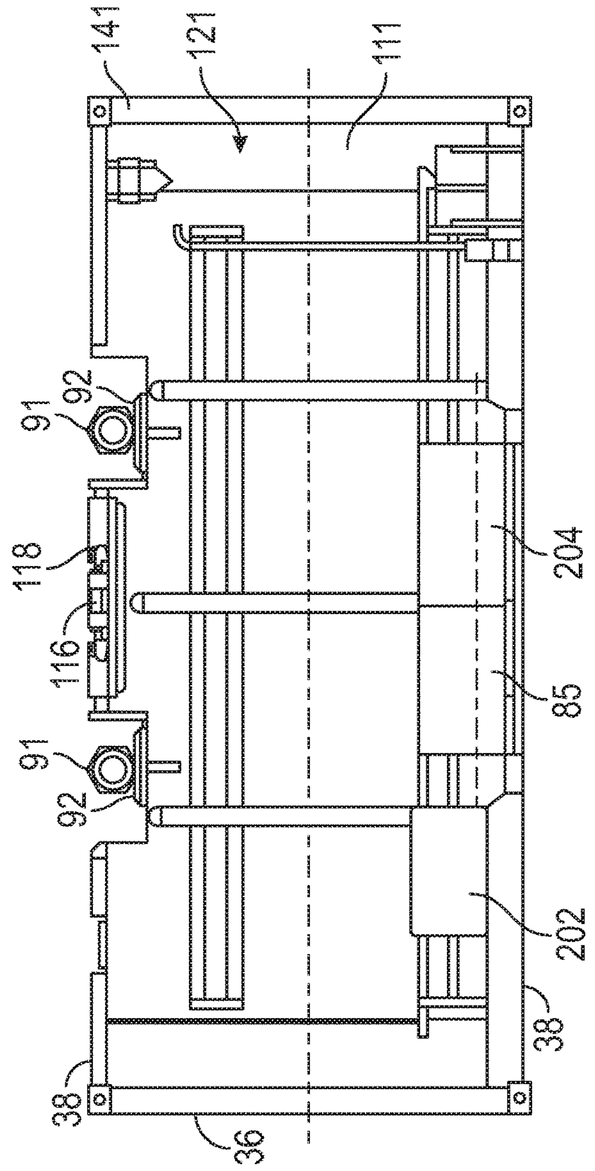
FIG. 2A is a front view and FIG. 2B is a side view of the storage vessel and the frame.
Figure 2A:
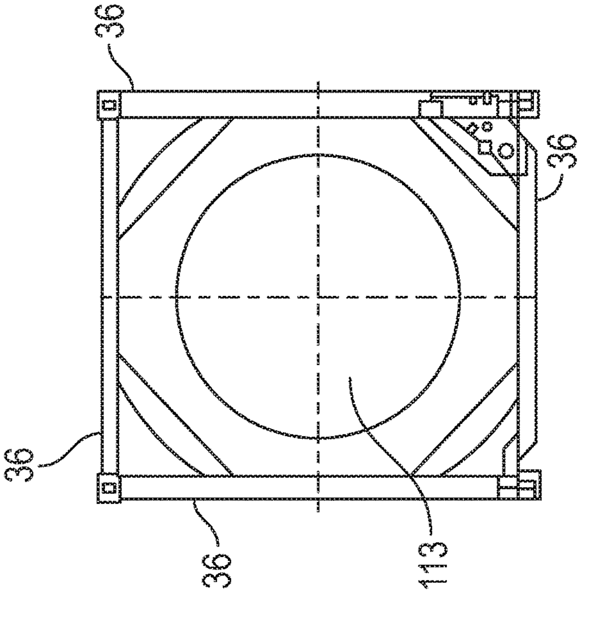
Figure 3:
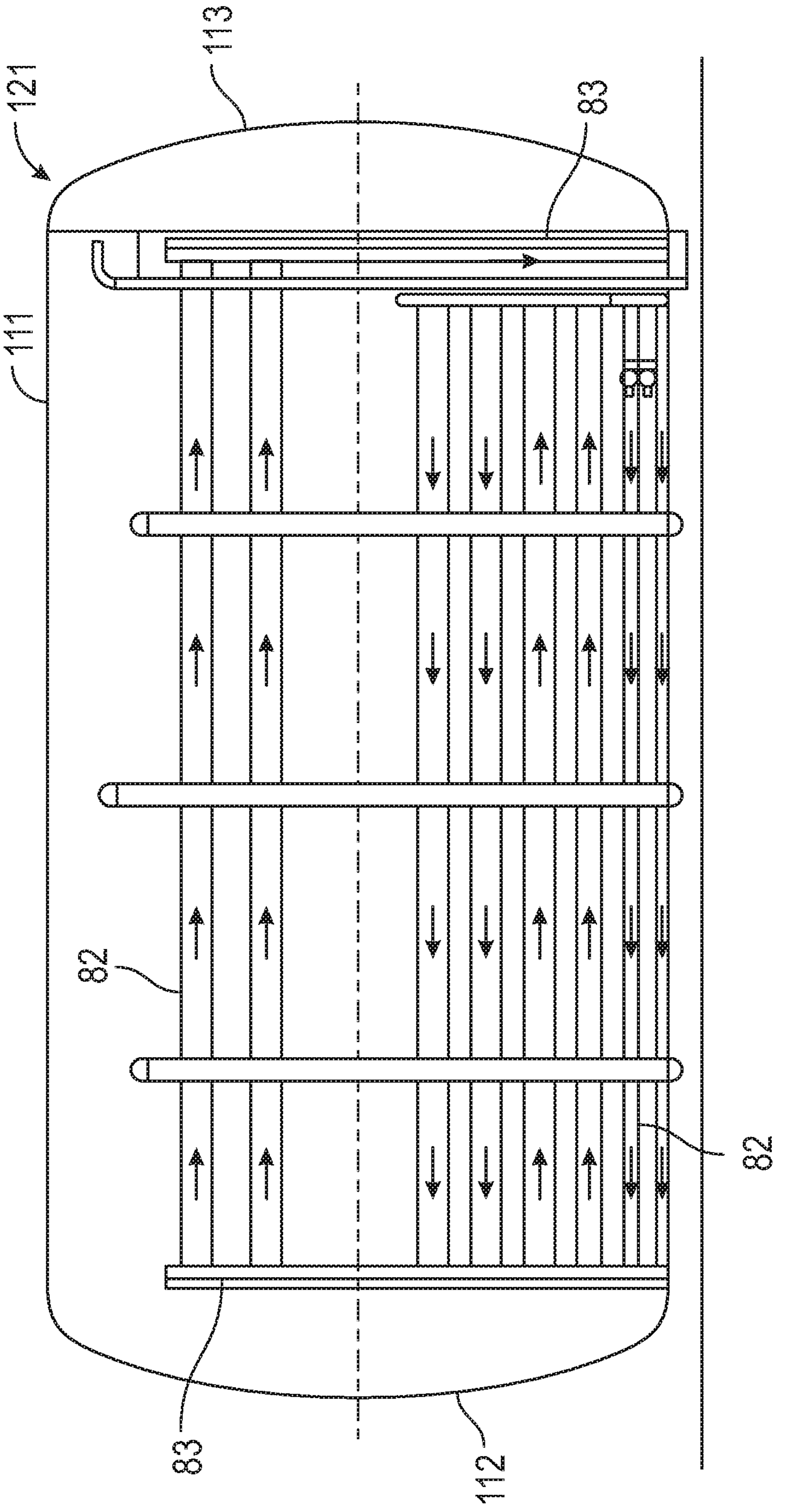
FIG. 3 illustrates the storage vessel with a device for controlling the temperature therein.

FIG. 1 illustrates an exemplary embodiment of a storage vessel 121 mounted within a frame 141. FIG. 2A is a front view and FIG. 2B is a side view of the storage vessel 121 and the frame 141. FIG. 3 illustrates the storage vessel 121 with the temperature control elements attached thereto. The storage vessel 121 may be used to transport a variety of products, including chemicals. The storage vessel 121 is disposed in and supported by a frame 141. The storage vessel 121 has a cylinder shaped body 111 with front end wall 112 and rear end wall 113. In some examples, the frond end wall 112 and the rear end wall 113 are planar. In some examples, the front end wall 112 and the rear end wall 113 are capped with non-planar covers. For example, each non-linear cover has a convex shape. The storage vessel 121 may be made of stainless steel. The cylinder shaped body 111 may be manufactured by rolling a sheet of stainless steel. A manhole lid 116 (shown in FIG. 2B) covers an opening 118 (shown in FIG. 2B) in the top of the storage vessel 121.

The frame 141 may have a cuboid shape. As shown, the frame 141 includes front and rear sides having a generally square configuration formed by connecting four rails 36. The two sides are connected to each other using four body rails 38. The rails 36, 38 may be attached to each other by welding. In one example, the sides are eight feet high and eight feet wide, and the body is 20 feet long. In other words, each rail 36 has a length of about eight feet and each rail 38 has a length of about 20 feet. The frame 141 may be constructed of carbon steel. A ladder 39 may be connected to the top and bottom rails 36 at one side of the frame 141. In one embodiment, the storage vessel 121 and the frame 141 are ISO compliant.

The frame 141 enables the storage vessel assembly, including the storage vessel 121 to be stacked with storage vessel assemblies. Additionally, storage vessel assembly can be transported on a trailer. The trailer can be of any conventional design adapted to support the storage vessel assembly.

The temperature control system may include temperature control elements, heat exchanger, heat exchange fluid, and optionally, insulation. Before the insulation is applied to the storage vessel, the temperature control elements are installed on the outside surface of the storage vessel. In some embodiments, the temperature control elements, such as pipes, are disposed between the storage vessel and an insulation covering the storage vessel. In some embodiments, the temperature control elements are pipe runs of different passes, sizes, capacities, and materials depending on design application.

FIG. 3 shows the temperature control elements installed on the storage vessel 121. In this example, the temperature control elements are a plurality of pipes 82 installed lengthwise on the storage vessel 121. One or more manifolds 83 may connect the plurality of pipes 82. The pipes 82 may surround at least 30% of the circumference of the storage vessel 121. In one example, the pipes surround between 40% and 80% of circumference of the storage vessel. Insulation is optionally added to the exterior of the storage vessel and the pipes to protect the storage vessel against heat exchange process with the surrounding environment.

A heat exchanger 85 (shown in FIG. 2B) is connected to the temperature control elements, and a heat exchanging liquid is circulated through the temperature control elements and heat exchanger. An exemplary heat exchange fluid is a glycol fluid. The heat exchanger 85 can be either a closed system or an open system depending on the design application and geographical location. In a closed system, the heat exchanger 85 is integrated within the boundary of the frame 141, as shown in FIG. 2B.

Figure 4:
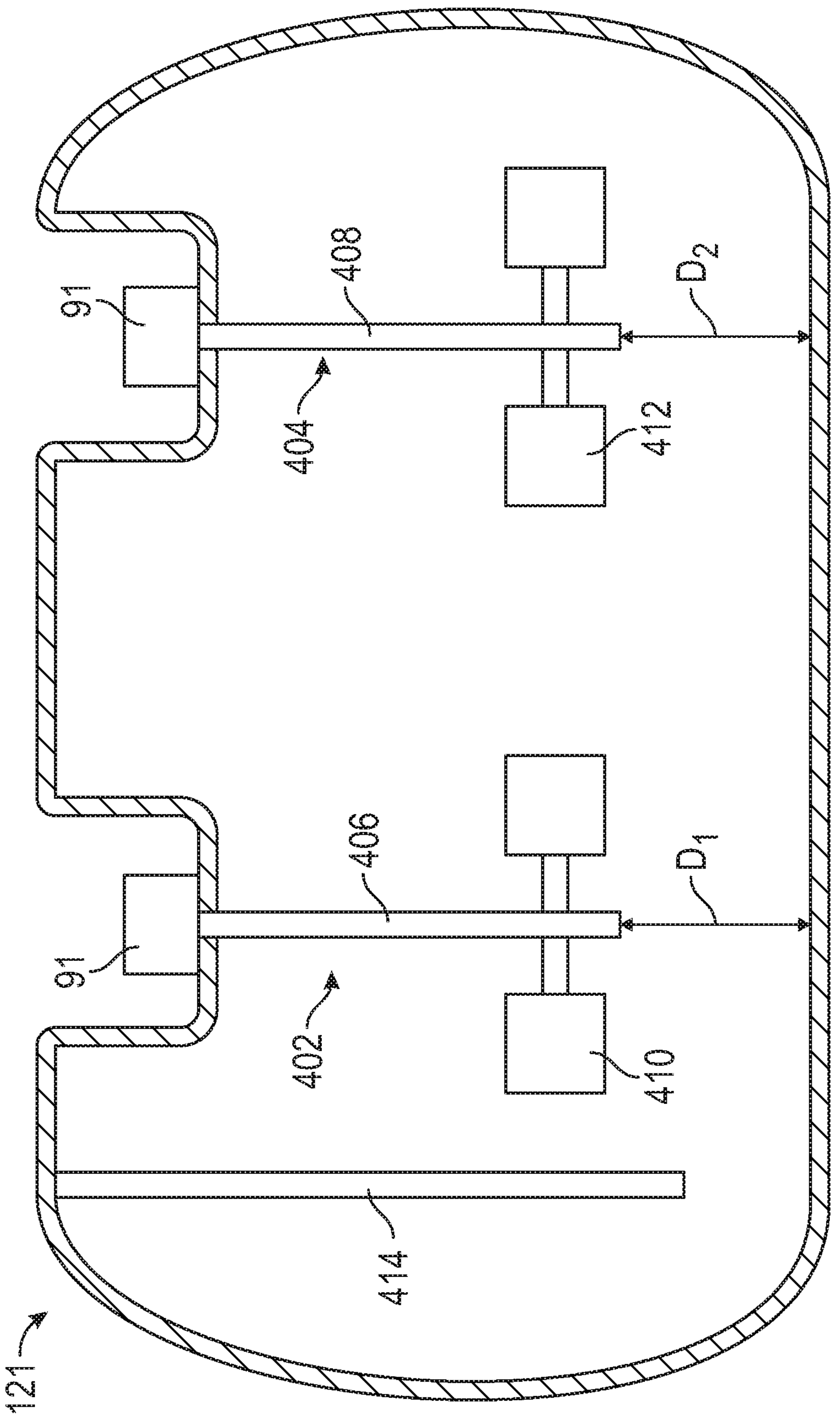
FIG. 4 illustrates a cross-sectional view of the storage vessel with an agitation device disposed therein.

FIG. 4 illustrates a cross-sectional view of the storage vessel with one or more agitation devices 402, 404 disposed therein. As shown in FIG. 4, the storage vessel 121 includes one or more agitation devices 402, 404 for agitating the contents of the vessel. In one example, the one or more agitation devices 402, 404 each include impellers 410, 412 for agitating the contents. As shown in FIG. 4, the storage vessel 121 includes two agitation devices 402, 404 for agitating the contents. Each agitation device 402, 404 includes a shaft 406, 408, respectively, and the shaft 406, 408 extends from an opening 92 (shown in FIG. 2B) at the top of the storage vessel. Each shaft 406, 408 is coupled to a motor 91 disposed over the opening 92. The motors 91 should be within the boundary of the frame 141. The motor 91 rotates shaft 406, 408, which in turn rotates impellers 410, 412 coupled to the shaft 406, 408, respectively. In some embodiments, the motors 91 can also move the shafts 406, 408 linearly, such as oscillating up and down, in addition to rotating the shafts 406, 408. The impellers 410, 412 are disposed inside storage vessel 121 and toward the bottom of the storage vessel 121. The impeller 410 is about a distance $D_1$ away from the bottom of the storage vessel 121, and the impeller 412 is about a distance $D_2$ away from the bottom of the storage vessel 121. In one example, each distance $D_1$ or $D_2$ is about 3 inches to 25 inches, preferably from 6 inches to 12 inches. In some embodiments, the distance $D_1$ is the same as the distance $D_2$. In some embodiments, the distance $D_1$ is different from the distance $D_2$. It must be noted that the storage vessel can contain any suitable number or configuration of agitation devices in any mechanical or operational shape or form intended to transfer momentum or vibration to the chemical in the storage vessel. In another example, a recirculation system is used to agitate chemicals. The recirculation system uses a pump 202 (shown in FIG. 2B) to remove chemicals from one or more locations of the storage vessel and pump the removed chemicals back into a different location of the storage vessel. The pump 202 does not pump the chemicals out of the storage vessel 121. The pump 202 may be coupled to the storage vessel 121 within the boundary of the frame 141.

The storage vessel 121 may include a fill measurement device 414 to measure the content level of the vessel. The fill measurement device 414 can be mounted anywhere on the top half of the storage vessel 121, as shown in FIG. 4. Any suitable fill measurement device may be used.

Referring back to FIG. 2B, the storage vessel 121 includes a controller 204 for monitoring and operating one or more of the components described herein, including the temperature control system (e.g., the heat exchanger 85), the agitator devices 402, 404, and the fill measurement device 414. The controller 204 is supported by the frame 141 surrounding the storage vessel 121. The controller 204 can control the amount of chemicals drawn from the storage vessel 121. The chemicals may be drawn by a pump and a meter that is independent from the storage vessel 121 and the frame 141. The storage vessel 121 can be connected to the meter and the pump using hoses or pipes. The heat exchanger, the one or more motors 91, and the controller 204 are disposed within the frame 141 in order for the storage vessel assembly to be stackable. In other words, the frame 141 of a first storage vessel assembly is disposed on the frame 141 of a second storage vessel assembly. Because the frame 141 has a cuboid shape, multiple frames 141 can be stacked on top of each other.

In one embodiment, the components of the storage vessel, such as the temperature control system and the agitation device, are contained within the boundaries of the steel frame that supports and contains the storage vessel. In another embodiment, the storage vessel may be equipped with a power system including a power source to operate one or more of the components of the storage vessel.

In one embodiment, the storage vessel is used to store a polymeric suspension and/or emulsion chemical. The storage vessel can properly maintain polymeric suspension and/or emulsion chemical for an extended period of time with the ability to supply an injection train. An exemplary chemical is a flow improver. The storage vessel can deliver its chemical via hoses and piping to an independent system that meters and pumps the chemical.

While the foregoing is directed to embodiments of the present disclosure, other and further embodiments of the disclosure may be devised without departing from the basic scope thereof, and the scope thereof is determined by the claims that follow.

The invention claimed is:

1. A storage vessel assembly for storing chemical, comprising:

- a storage vessel;
- a frame having a cuboid shape;
- an agitation device disposed in the storage vessel;
- a temperature control system coupled to the storage vessel and including a plurality of pipes and a manifold disposed around the exterior of the storage vessel; and a pump configured to pump chemicals from a first location of the storage vessel to a second location in the storage vessel, wherein the storage vessel, the temperature control system, and the pump are disposed within a boundary of the frame, and wherein the plurality of pipes are disposed below a midpoint of the storage vessel.

2. The assembly of claim 1, wherein the agitation device comprises an impeller coupled to a shaft.

3. The assembly of claim 2, wherein the impeller is located from 6 inches to 12 inches above a bottom of the storage vessel.

4. The assembly of claim 2, further comprising a motor coupled to the shaft.

5. The assembly of claim 4, wherein the impeller moves up and down during operation.

6. The assembly of claim 4, wherein the motor is disposed over an opening at a top of the storage vessel and is disposed within the boundary of the frame.

7. The assembly of claim 6, wherein the storage vessel comprises a cylinder shaped body manufactured by rolling a sheet of stainless steel.

8. The assembly of claim 1, wherein the temperature control system further comprises a heat exchanger disposed within the frame.

9. The assembly of claim 1, wherein the frame is stackable and transportable to move the storage vessel and the chemical to another location.

10. A storage vessel assembly for storing chemical, comprising:

a storage vessel;

a frame having a cuboid shape;

a first agitation device disposed in the storage vessel, wherein the first agitation device comprises a first impeller coupled to a first shaft, and wherein the first impeller is a first distance away from a bottom of the storage vessel;

a second agitation device disposed in the storage vessel, wherein the second agitation device comprises a second impeller coupled to a second shaft, and wherein the second impeller is a second distance away from a bottom of the storage vessel;

a pump configured to circulate a portion of the chemical from a first location of the storage vessel to a second location in the storage vessel, wherein the pump and the storage vessel are disposed within a boundary of the frame; and a temperature control system disposed within the boundary of the frame, the system having:

a heat exchanger disposed within the frame; and a plurality of pipes disposed around the exterior of the storage vessel and disposed below a midpoint of the storage vessel, wherein the plurality of pipes are coupled to the heat exchanger.

11. The assembly of claim 10, further comprising a motor coupled to each agitation device.

12. The assembly of claim 11, wherein the motor is disposed over an opening at a top of the storage vessel and is disposed within the boundary of the frame.

13. The assembly of claim 10, wherein the first distance and the second distance each ranges from 3 inches to 25 inches.

14. The assembly of claim 10, wherein the first distance and the second distance each ranges from 6 inches to 12 inches.

15. The assembly of claim 10, wherein the first distance is the same as the second distance.

16. The assembly of claim 10, wherein the first distance is different from the second distance.

17. The assembly of claim 10, wherein the frame is stackable and transportable to move the storage vessel and the chemical to another location.

18. The assembly of claim 17, wherein the temperature control system further includes a manifold in fluid communication with the plurality of pipes.

19. The assembly of claim 17, wherein the storage vessel comprises a cylinder shaped body manufactured by rolling a sheet of stainless steel.

20. The assembly of claim 17, wherein the frame, storage vessel, and the chemical are transported on a trailer.

* * * * *